UNITED STATES PATENT OFFICE.

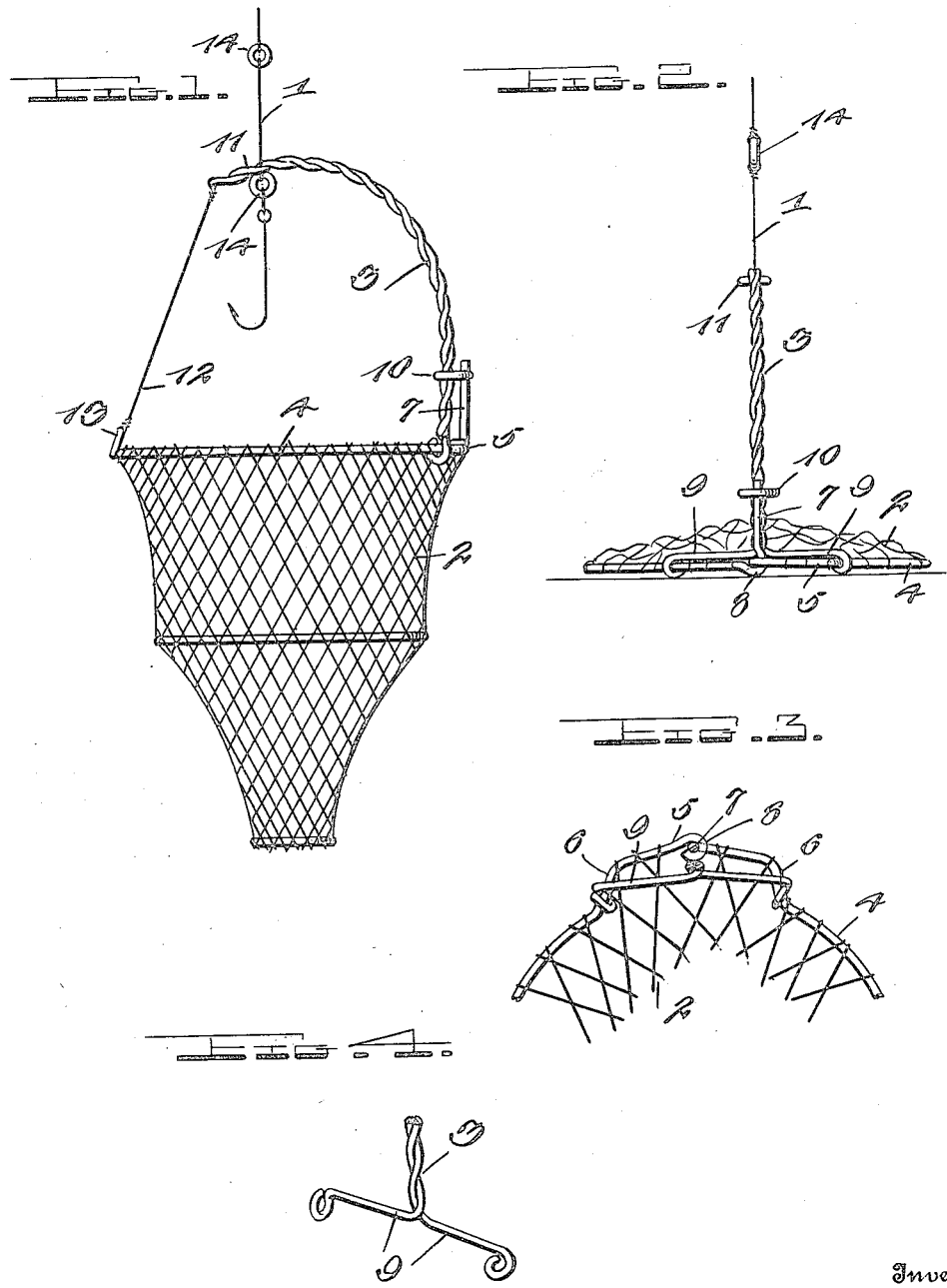

JOHN H. ZEVELY, OF WINSTON SALEM, NORTH CAROLINA.

FISHING-TACKLE.

1,032,100.   Specification of Letters Patent.   Patented July 9, 1912.

Application filed March 2, 1912. Serial No. 681,063.

*To all whom it may concern:*

Be it known that I, JOHN H. ZEVELY, a citizen of the United States, residing at Winston Salem, in the county of Forsyth and State of North Carolina, have invented certain new and useful Improvements in Fishing-Tackle, of which the following is a specification, reference being had to the accompanying drawings.

This invention comprehends certain new and useful improvements in fishing tackle, and relates more specifically to nets which are adapted to be secured on fishing lines below the bait for the purpose of entrapping the fish.

The object of the invention is to provide a collapsible device of this nature which will lie flatly upon the bottom of the fishing ground so as to pass unnoticed by the fish and which may be quickly opened at the proper time by pulling on the fishing line.

Another object of the invention is to provide a device simple in structure, efficient in operation and capable of catching a plurality of fish at once.

The invention also aims to generally improve this type of fishing tackle to render it more useful and commercially desirable.

With these and other objects in view as will be fully explained as the description proceeds the invention consists in certain constructions and arrangements of parts that will be hereinafter fully described and claimed.

For a complete understanding of the invention reference is to be had to the following description and accompanying drawing, in which:—

Figure 1 is a side elevation showing basket open; Fig. 2 is a rear elevation showing basket closed; Fig. 3 is a detail plan view of hinged end of bail and adjoining portion of net; and Fig. 4 is a perspective view of end of bail.

Similar parts are referred to in the description and designated in the drawing by like reference characters.

Referring to the drawing by numerals, 1 designates a fishing line on the end of which is mounted the collapsible net 2 through the medium of the bail 3. The net is conically shaped and provided with a plurality of graded wire rings secured in the meshes of the net and adapted to cause the net to open when it is raised. The upper and largest ring 4 surrounds the mouth of the net and is provided adjacent its closing point with an offset portion 5, formed by bending the wire outwardly as at 6, and a vertical stem 7 intermediate this offset 6, formed by bending one end of the wire upwardly. The other end of the ring 4 is connected to the base of the stem 7 by being looped around it as shown at 8.

The bail 3 is formed from a single piece of wire by twisting the intermediate portions together and curving as shown, and bending the ends laterally at right angles to the twisted portion to form the arms 9. To hingedly secure this bail 3 to the ring 4 the ends of the arms 9 are twisted around the ring at the base of the shoulders 6. This form of connection allows the bail to be swung upwardly until its free end is over the center of the net. To retain it in this position I provide a small locking ring 10 mounted thereon and adapted to engage the stem 7. The loop 11 in the free end of the bail through which the fishing line 1 passes, prevents the locking ring 10 being lost. A flexible brace 12 secured to loop 11 in the bail and loop 13 in the ring 4 prevents the bail 3 being bent too far backward.

My device is assembled and operated as follows: The line with a bait retaining member on its end is passed through the loop in the bail and provided with spaced stops 14. With the bail 3 secured in its upright position, the device is allowed to rest on the bottom of the fishing ground in which position the net will be collapsed. As soon as a fish is thought to be nibbling the bait the line is quickly raised, opening the net and catching the fish.

This method of catching fish is humane and economical, being far superior to the common way, in that the same bait may be used repeatedly and a number of fish caught at a time.

Having thus described my invention, what I claim is:—

1. A conical shaped fish net having a plurality of graded rings horizontally fastened in the meshes of the net, the upper ring, which is the largest encircles the mouth of the net, and is provided adjacent its closing point with an offset portion and has intermediate of this portion a vertically extending stem formed integrally with one end of the ring and to the base of which is secured the other end, a twisted wire bail having at one end a loop through which the fishing line passes and provided at the other end with two laterally extending arms, the outer ends of which are twisted around said upper ring adjacent the offset portion, a locking ring slidably positioned on the bail and adapted to engage the said stem and a flexible brace positioned between the free end of the bail and the aforementioned upper ring.

2. A conical shaped fish net having a plurality of graded rings horizontally positioned in the meshes thereof, the upper ring, which is the largest, encircling the mouth of the net and provided with an offset portion, a vertical stem intermediate said offset portion, a bail hingedly secured to the upper ring adjacent the arms of said offset portion and a locking ring slidably positioned on the bail and adapted to engage the said stem for holding the bail in upright position.

3. A conical shaped fish net having a plurality of graded rings positioned in the meshes, the upper ring encircling the mouth of the net and provided with an offset portion, a bail hingedly secured to the upper ring and prevented from sliding thereon by engagement with the arms of the said offset portion and means for locking the bail in operative position.

4. A conical shaped fish net having its large end open to provide a mouth, a ring encircling the mouth having a vertical stem, a bail pivotally mounted on the ring, and means for securing the bail to the said vertical stem.

5. A conical shaped fish net having its large end open to provide a mouth, a ring encircling the mouth, a twisted wire bail having at one end a loop through which the fishing line passes and provided at the other end with two laterally extending arms, the outer ends of which are twisted around said ring, and means for retaining the bail in a vertical position.

6. A conical shaped fish net having its large end open to provide a mouth, a ring encircling the mouth, a twisted wire bail pivotally mounted on said ring and extending over the mouth of the net, said bail being provided near its outer end with a loop through which the fishing line passes, and means for locking the bail in a vertical position.

In testimony whereof I hereunto affix my signature in the presence of two witnesses.

JOHN H. ZEVELY.

Witnesses:
L. G. REED,
H. W. MOSTEN.